United States Patent Office
2,974,010
Patented Mar. 7, 1961

2,974,010
PREPARATION OF NITROGEN-PHOSPHORIC ACID COMPOUNDS

Alfred Köster, Dusseldorf-Oberkassel, Germany, assignor to Henkel & Cie. G.m.b.H., Dusseldorf-Holthausen, Germany, a German corporation No Drawing. Filed July 19, 1957, Ser. No. 672,860

Claims priority, application Germany Aug. 16, 1956

12 Claims. (Cl. 23—106)

This invention relates to new and useful improvements in the preparation of nitrogen-phosphoric acid compounds.

Nitrogen-phosphoric acid compounds are conventionally used as water softening and anti-corrosion agents and as additives for detergents and rinsing agents.

These nitrogen-phosphoric acid compounds may conventionally be prepared by reacting phosphorous pentoxide or phosphorous oxychloride with ammonia or with a compound which readily splits off ammonia, such as urea. This conventional method of preparation has a disadvantage however that the starting products, such as the phosphorous pentoxide or phosphorous oxychloride are very sensitive to moisture, such as the atmospheric moisture so that special precautions have to be taken in handling the same in the process which substantially increases production costs.

One object of this invention is a novel method for the preparation of nitrogen-phosphoric acid compounds without the above mentioned disadvantage. This and still further objects will become apparent from the following description:

In accordance with the invention, it has been found that nitrogen-phosphoric acid compounds may be prepared by reacting an alkali or ammonium salt of a condensed anhydrous phosphate with ammonia at an elevated temperature under pressure.

The starting anhydrous salts of phosphoric acid contain less water than orthophosphoric acid and are readily available.

These starting salts are anhydrous alkali salts, i.e. the alkali salts which are free of water of crystallization, of condensed phosphoric acids such as sodium pyrophosphate, sodium trimetaphosphate, sodium hexametaphosphate, tripolyphosphates, as well as tetrapolyphosphates and their mixtures. In place of the sodium salts other alkali salts, as for example, the corresponding potassium salts or ammonium salts of these compounds may be used.

The reaction is effected by contacting the anhydrous salt and the ammonia at a temperature between about 50 and 130° C. and preferably between about 100 to 120° C., under an elevated pressure. Most simply, the reaction may be effected in a closed pressure vessel under the pressure of the ammonia itself at the reaction temperature. In this connection, it is practical to use an excess of the ammonia preferably 10–100 mols of ammonia per mol condensed anhydrous alkali or ammonium phosphate, because it is useful, if during the reaction the pressure in the closed vessel is not decreased by contacting of the ammonia and the anhydrous salt. The pressures at which the reaction are effected, may range for example, between about 30 and 120 atmospheres' gauge and preferably between about 70 and 100 atmospheres' gauge. The ammonia may be passed into the reaction in gaseous form or preferably may previously be added in the form of liquid ammonia which is mixed with the condensed phosphate.

The reaction may for example be effected by introducing the condensed phosphate and the ammonia in liquid form into a suitable pressure vessel or introducing the ammonia in gaseous form under pressure into a reaction vessel containing the condensed phosphate and then heating the vessel for about one hour at a temperature between about 100 and 120° C. The gaseous ammonia which may be used can be utilized without any previous drying since small quantities of water do not substantially effect the yield of the nitrogen-phosphoric acid compounds.

The reaction product is simply obtained by releasing the ammonia gas and removing the same and no special working up is necessary.

It has furthermore been found preferable to effect the reaction in the presence of ammonia salts as when effecting the reaction in this manner it has been found that the percentage of amide or imide nitrogen referred to the total nitrogen content is increased. In this connection, there are preferably used ammonium salts which are soluble in liquid ammonia, as for example, ammonium salts of strong acids such as ammonium chloride or ammonium sulphate. The salts are preferably added in quantities of about 10–20% by weight referred to the alkali phosphate. The additional ammonium salts present in the final reaction method can, if desired, be removed by extraction with liquid ammonia or by treatment with diethylamine and chloroform.

The formation of the nitrogen-phosphoric acid compounds in accordance with the invention, is believed to involve as a predominant reaction, the ammonolysis of the P-O-P bonds in accordance with the scheme

In addition to this predominant reaction, of course a number of additional reactions occur.

The nitrogen-phosphoric acids obtained in accordance with the invention may be used in the conventional manner as water softening and anti-corrosion agents as well as additives for rinsing agents and detergents, such as washing and cleaning agents.

The following examples are given by way of illustration and not limitation:

*Example 1*

3 grams anhydrous sodium trimetaphosphate and 100 cc. liquid ammonia are heated in a 300 cc. autoclave for one hour at 120° C. The pressure is about 80 atmospheres' gauge. After the distilling off of the ammonia there remains a product containing 23% phosphorus and 7.9% total nitrogen. 40% of the total nitrogen is present in the form of amide or imide nitrogen.

*Example 2*

3 grams anhydrous sodium metaphosphate and 0.5 gram ammonium chloride are reacted with ammonia in the same manner as in Example 1. The final product contains 0.5 gram ammonium chloride and 3.3 grams of a nitrogen-phosphoric acid compound having a phosphorous content of 23.2% and a total nitrogen content of 4.09%. 90% of the total nitrogen is present in the form of amide or imide nitrogen.

*Example 3*

3 grams anhydrous sodium tripolyphosphate are mixed with 0.5 gram ammonium chloride and 100 cc. liquid ammonia and heated for about 1 hour at 120° C. in an autoclave. The pressure produced in this connection is about 80 atmospheres' gauge. After completion of the reaction the ammonia is blown off. The reaction product obtained contains 6.89% total nitrogen and 22.93% phosphorus. 37% of the total nitrogen is present in the form of amide or imide nitrogen.

Example 4

3 grams anhydrous ammonium tetrapolyphosphate are reacted with 100 ccm. liquid ammonia in the same manner as described in Example 1. After completion of the reaction the ammonia is blown off. The reaction product obtained contains 22.8% phosphorus and 2.3% amide or imide nitrogen.

Example 5

3 grams anhydrous potassium trimetaphosphate are reacted with 100 ccm. liquid ammonia as described in Example 1. After distilling off the ammonia there remains a product containing 21.8% phosphorus and 3.3% amide or imide nitrogen.

Example 6

Instead of the liquid ammonia in Example 5 the corresponding quantity of ammonia in gaseous form is used. The ammonia is introduced under pressure of 10 atmospheres' gauge at room temperature. Thereafter the reaction vessel is heated as described in Example 1. After the distilling off of the ammonia there remains a product which is the same as in Example 5.

I claim:

1. Process for the production of nitrogen-phosphoric acid compounds which consists essentially of reacting anhydrous ammonia with a member selected from the group consisting of the anhydrous phosphate salt of ammonia and alkali metals, and mixtures thereof, said phosphate salt being selected from the group consisting of pyrophosphate, metaphosphate, trimetaphosphate, hexametaphosphate, tripolyphosphate and tetrapolyphosphate at a pressure of between about 30 to 120 atmospheres' gauge and at a temperature of between about 50 to 130 degrees C. and recovering the nitrogen-phosphoric acid compound formed.

2. Process according to claim 1 in which said alkali metal salt is a potassium salt.

3. Process according to claim 1 in which said reacting is effected at a pressure between about 30-100 atmospheres' gauge.

4. Process according to claim 3 in which said reacting is effected at a pressure between about 70-100 atmospheres' gauge.

5. Process according to claim 1 in which said reacting is effected at a temperature between about 100-120° C.

6. Process according to claim 5 in which said reacting is effected at a pressure between about 70-100 atmospheres' gauge.

7. Process according to claim 1 in which said reacting is effected in the presence of an ammonium salt of a strong acid.

8. Process according to claim 7 in which said ammonium salt of a strong acid is present in amount of about 10-20% by weight of said phosphate.

9. Process according to claim 8 in which said ammonium salt of a strong acid is ammonium sulfate.

10. Process according to claim 8 in which said ammonium salt of a strong acid is ammonium chloride.

11. Process according to claim 1 in which said alkali metal salt is a sodium salt.

12. Process according to claim 1 in which said reacting is effected in presence of an excess of ammonia.

References Cited in the file of this patent

UNITED STATES PATENTS

| | | |
|---|---|---|
| 1,514,912 | Klugh | Nov. 11, 1924 |
| 2,561,415 | Rice | July 24, 1951 |
| 2,717,198 | Jones et al. | Sept. 6, 1955 |
| 2,856,279 | Hignett et al. | Oct. 14, 1958 |